United States Patent
Liu et al.

(10) Patent No.: US 9,557,866 B2
(45) Date of Patent: Jan. 31, 2017

(54) CAPACITIVE TOUCH PANEL AND TOUCH DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yingming Liu, Beijing (CN); Haisheng Wang, Beijing (CN); Shengji Yang, Beijing (CN); Weijie Zhao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/344,554

(22) PCT Filed: May 20, 2013

(86) PCT No.: PCT/CN2013/075933
§ 371 (c)(1),
(2) Date: Mar. 12, 2014

(87) PCT Pub. No.: WO2014/139213
PCT Pub. Date: Sep. 18, 2014

(65) Prior Publication Data
US 2014/0267956 A1 Sep. 18, 2014

(30) Foreign Application Priority Data
Mar. 15, 2013 (CN) .......................... 2013 1 0084668

(51) Int. Cl.
*G06F 3/044* (2006.01)

(52) U.S. Cl.
CPC .................................... *G06F 3/044* (2013.01)

(58) Field of Classification Search
CPC ................................ G06F 3/041; G06F 3/044
(Continued)

(56) References Cited

U.S. PATENT DOCUMENTS

2008/0277259 A1* 11/2008 Chang ..................... G06F 3/044
200/600
2008/0309633 A1* 12/2008 Hotelling .............. G06F 3/0412
345/173

(Continued)

FOREIGN PATENT DOCUMENTS

CN 102262474 A 11/2011
CN 202351842 U * 7/2012
(Continued)

OTHER PUBLICATIONS

International Search Report mailed Dec. 19, 2013; PCT/CN2013/075933.
(Continued)

*Primary Examiner* — Ilana Spar
*Assistant Examiner* — Mihir K Rayan
(74) *Attorney, Agent, or Firm* — Ladas & Parry LLP

(57) ABSTRACT

Embodiments of the present invention disclose a capacitive touch panel and a touch display apparatus, which includes a substrate and at least a transparent electrically conductive layer; the transparent electrically conductive layer includes a plurality of electrode groups, each of electrode groups includes a plurality of electrodes in series, each of electrode groups connects to a sensing lead at one side, at lease one of the electrode groups is arranged along a direction away from the sensing lead, and capacitances formed between the electrodes of the at least one of the electrode groups and common electrodes are reduced gradually along the direc-
(Continued)

tion. The capacitive touch panel and touch display apparatus according to embodiments of the present invention are configured such that the farther away from the sending lead the electrode is, the smaller the capacitance of the electrode is, thus the signal delay of the electrode far away from the sending lead is improved and the touch sensitivity is improved.

16 Claims, 2 Drawing Sheets

(58) Field of Classification Search
USPC .............. 345/156, 157, 173, 174; 178/18.01, 178/18.06, 20.01
See application file for complete search history.

(56) References Cited

U.S. PATENT DOCUMENTS

| | | | | |
|---|---|---|---|---|
| 2009/0085891 | A1* | 4/2009 | Yang | G06F 3/044 345/174 |
| 2010/0090980 | A1* | 4/2010 | Chen | G06F 3/044 345/174 |
| 2010/0136868 | A1* | 6/2010 | Chien | G06F 3/0412 445/24 |
| 2010/0309164 | A1* | 12/2010 | Yeh | G06F 3/044 345/174 |
| 2011/0018829 | A1* | 1/2011 | Peng | G06F 3/044 345/173 |
| 2011/0187676 | A1* | 8/2011 | Chang | G06F 3/044 345/174 |
| 2011/0242050 | A1* | 10/2011 | Byun | G06F 3/044 345/174 |
| 2011/0291963 | A1 | 12/2011 | Woo et al. | |
| 2012/0007832 | A1* | 1/2012 | Lee | G06F 3/03547 345/174 |
| 2012/0105365 | A1* | 5/2012 | Lin | G06F 3/044 345/174 |
| 2012/0133613 | A1* | 5/2012 | Chen | G06F 3/044 345/174 |
| 2013/0194213 | A1* | 8/2013 | Chou | G06F 3/044 345/173 |
| 2014/0313164 | A1* | 10/2014 | Pi | 345/174 |
| 2015/0015803 | A1* | 1/2015 | Wang | G06F 3/044 349/12 |

FOREIGN PATENT DOCUMENTS

| | | | |
|---|---|---|---|
| CN | 102855034 | * | 1/2013 |
| CN | 102855034 A | | 1/2013 |
| TW | 201015411 A | | 4/2010 |

OTHER PUBLICATIONS

International Preliminary Report on Patentability Appln. No. PCT/CN2013/075933; Dated Sep. 15, 2015.
First Chinese Office Action dated Jun. 2, 2016; Appln. No. 201310084668.4.
Second Chinese Office Action dated Oct. 8, 2016; Appln. No. 201310084668.4.

* cited by examiner

CAPACITIVE TOUCH PANEL AND TOUCH DISPLAY APPARATUS

TECHNICAL FIELD

The present disclosure relates to a capacitive touch panel and a touch display apparatus.

BACKGROUND

With the rapid development of touch screens, the touch screens have already dominated the flat-plane display (FPD). There is a great desire for manufacturers to design high-performance and low-cost touch screens in the limited space without changing display effects with the required optical properties and electrical properties of the display continually improved, as well as the continually demand for thinner display by customers.

The structure design shown in FIG. 1 is the typical one adopted in the panel of currently conventional capacitive touch screens, which comprises a longitudinal sensing electrode group and a lateral drive electrode group. The sensing electrode group and the drive electrode group are insulated from each other and they each form a capacitor with a common electrode; each of the sensing electrode group and the drive electrode group is connected with sensing leads 4 at one side; wherein the drive electrode group includes a plurality of drive electrodes 1 in series, the plurality of drive electrodes 1 are connected through metal connection bridges 3; the sensing electrode group includes a plurality of sensing electrodes 2 in series. As an electrical field is existed in a human body, touching a surface of the capacitive touch panel with a finger results in a coupling capacitance formed between the finger and the sensing and drive electrodes of the touch panel. Due to the change of capacitance at the touching point, currents are induced in the sensing and drive electrodes, to flow toward the touching point. The induced current has intensity inversely proportional to a distance between the finger and a boundary of the touch panel. Positions of the touching point can be accurately computed by measuring the induced currents with sensors connected to the sensing and drive electrodes via sensing leads. In the prior art, each of electrodes in the electrode group has same size.

In a practical application, since the touching points have different distance from the sensing leads, the sensor will cost a longer time to receive the induced current when the touching point is far away from the sensing leads 4, so that a signal delay is presented. In the panel shown in FIG. 1, the electrode which is far away from the sensing lead 4 has a lower sensitivity than the electrode near the sensing leads 4, thus, the farther away from the sensing leads the position is, the lower the sensitivity is in the capacitive touch screen. This difference between the sensitivities is adverse to the effective touch control of the capacitive touch screen, and it reduces the satisfaction to the products by the customer.

SUMMARY

In view of above, embodiments of the present invention aim to provide a capacitive touch panel and touch display apparatus, which can improve the sensitivity of the positions far away from the sensing leads.

In order to achieve the above purpose, the technical solutions of embodiments of the present invention can be performed in ways of:

A capacitive touch panel includes a substrate and at least a transparent electrically conductive layer; the transparent electrically conductive layer includes a plurality of electrode groups, each of the electrode groups includes a plurality of electrodes in series, each of the electrode groups connects to sensing lead(s) at one side, at lease one of the electrode groups is arranged along a direction away from the sensing lead(s), and capacitances formed between the electrodes of the at least one of the electrode groups and common electrode(s) are reduced gradually along the direction.

A touch display apparatus includes the above described capacitive touch panel.

BRIEF DESCRIPTION OF THE DRAWINGS

The present invention will become more fully understood from the detailed description given hereinafter and the accompanying drawings which are given by way of illustration only, and thus are not limitative of the present invention, wherein.

DETAILED DESCRIPTION OF THE PREFERRED EMBODIMENTS

Figure 1:
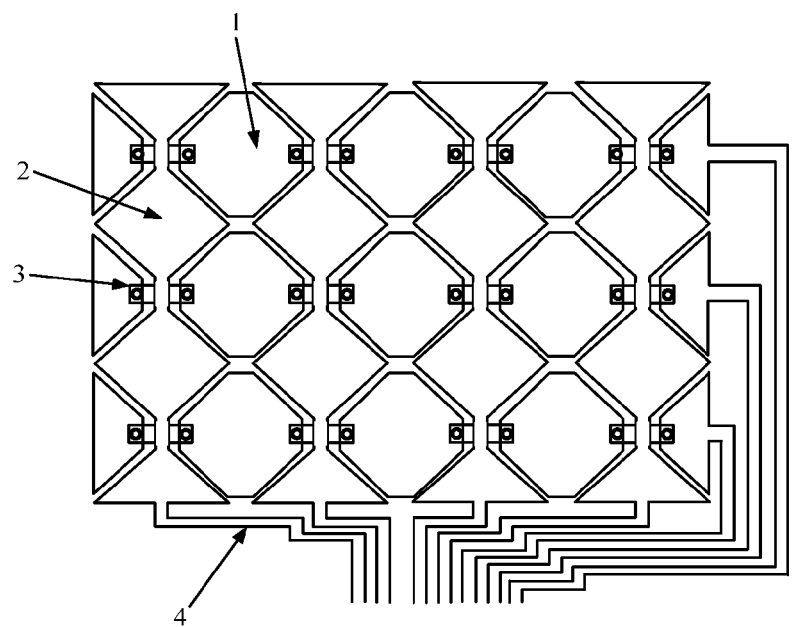
FIG. 1 is a structural schematic diagram of a capacitive touch panel in the prior art.

Technical solutions according to the embodiments of the present invention will be described clearly and completely as below in conjunction with the accompanying drawings of embodiments of the present invention. It is apparent that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the terminologies used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "On," "above," "under," "below," "left," "right," or the like are only used to indicate relative position relationship, and when the position of the object which is described is changed, the relative position relationship may be changed accordingly.

In the operation of touch screens, an equation Q=CU is involved, wherein Q is electric charge quantity, C is capacitance between a common electrode and an electrode which a signal passed through from a sensor to a touching point, and U is voltage. By substituting/incorporating equation Q=It (I is current, and t is time) and U=IR (R is the resistance of material(s) that a signal passed through from the sensor to the touching point) into the equation Q=CU, an equation t=CR is obtained, i.e., a signal delay time is obtained. The value of signal delay time represents a sensitivity of the electrode. Thus, the capacitance between the electrodes is reduced in order to reduce the signal delay and thereby ensure the sensitivity of electrodes far away from the sensing leads.

According to above discuss, embodiments of the present invention provide a capacitive touch panel including a substrate and at least a transparent electrically conductive layer. The transparent electrically conductive layer includes a plurality of electrode groups, each of the electrode groups includes a plurality of electrodes in series. Each of electrode groups connects to a sensing lead at one side, and at lease one of the electrode groups is arranged along a direction away from the sensing lead. The capacitances formed between the electrodes of the at least one of the electrode groups and common electrode(s) are reduced gradually. The term "at least one of the electrode groups" refers to that as long as there is one electrode group arranged along a direction away from the sensing leads, and the capacitances formed between the electrodes of the at least one electrode group and the common electrodes are reduced gradually along the direction away from the sensing lead, the electrode group can have reduced signal delay of the electrode(s) far away from the sensing lead and improved touch control sensitivity. Preferably, all of the electrode groups are improved.

In particular, for example, if the electrode groups are arranged along the direction away from the sensing lead(s), the electrodes of the electrode groups can be set to allow the effective areas for generating capacitances to be gradually decreased, that is, the capacitance formed between an electrode and a common electrode is reduced by decreasing the area of the electrode.

In particular, for example, if the electrode groups are arranged along the direction away from the sensing lead(s), the electrodes of the electrode groups have areas sequentially decreased by 5%, wherein the term "decreased by 5%" refers to the areas of the electrodes being sequentially deceased by 5%.

In particular, for example, a suspending electrode is disposed on each of the electrodes and the suspending electrodes of the electrode groups have areas gradually decreased along the direction away from the sensing lead.

In particular, for example, the suspending electrode on each electrode is formed by etching an annulus-like groove on the electrode. A region surrounded by the annulus-like groove is the suspending electrode.

In particular, for example, the suspending electrodes on the electrodes of the electrode groups have areas sequentially decreased by 5% along the direction away from the sensing lead.

In particular, for example, the electrode groups comprise a plurality of lateral drive electrode groups and a plurality of longitudinal sensing electrode groups. The drive electrode groups and the sensing electrode groups are insulated from each other. The drive electrode group includes a plurality of drive electrodes in series, and the sensing electrode group includes a plurality of sensing electrodes in series. The drive electrodes of the drive electrode groups have areas gradually decreased along a direction of the drive electrode groups being away from the sending lead(s); and/or the sensing electrodes of the sensing electrode groups have areas gradually decreased along a direction of the sensing electrode groups being away from the sending lead(s).

Optionally, the electrode groups according to embodiment(s) of the present invention may only include the sensing electrode groups. In this case, it only needs to set the sensing electrodes of the sensing electrode groups.

In particular, for example, if the drive electrode groups are arranged along the direction away from the sensing lead(s), the capacitances are reduced by decreasing the effective areas of the drive electrodes for generating capacitances; if the sensing electrode groups are arranged along the direction away from the sensing lead(s), the capacitances are reduced by decreasing the effective areas of the sensing electrodes for generating capacitances; that is, the capacitances are reduced by decreasing the areas of the sensing electrodes and/or the drive electrodes.

It is understood that the drive electrode groups according to the embodiments of the present invention are not limited to lateral arrangement and the sensing electrode groups according to the embodiments of the present invention are not limited to longitudinal arrangement. The sensing electrode groups can be laterally arranged and the drive electrode groups can be longitudinally arranged.

The foregoing embodiments according to the present invention will be described in detail hereinafter in conjunction with accompanying drawings. As the settings for the sensing electrodes are substantially same with that for the drive electrodes, and the improvement can be only applied to the sensing electrode groups, or only applied to the drive electrode groups, or applied to both the sensing electrode groups and the drive electrode groups, the following description are discussed based on the drive electrodes in the capacitive touch panel as an example.

Figure 2:
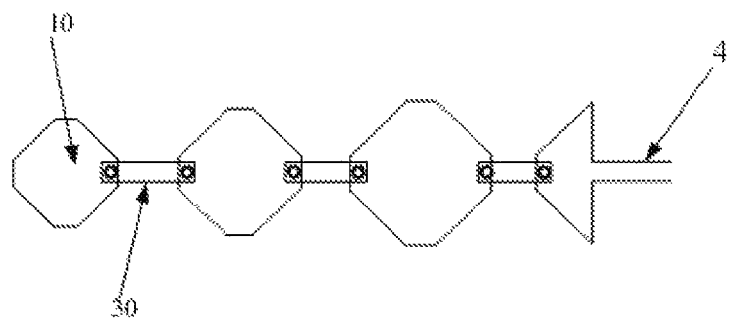
FIG. 2 is a structural schematic diagram of a capacitive touch panel according to an embodiment of the present invention.

Referring to FIG. 2, each of the drive electrodes 10 in the capacitive touch panel is sequentially connected through connection bridges 30. The farther away from the sensing lead 4 the position is, the smaller the area of the electrode is. For example, each of the drive electrodes 10 has an area sequentially decreased by 5% along the direction away from the sensing lead 4. Thus, the farther away from the sensing lead 4 the electrode is, the smaller the capacitance formed between the electrode and the common electrode is. As the signal delay generated by RC can be reduced, the electrodes that are far away from the sensing lead have improved touch sensitivity.

It is noted that as the areas of the drive electrodes and the sensing electrodes are decreased, the lengths are proportionally shortened. According to the resistance equation $R=\rho L/S$ (wherein $\rho$ is the resistivity, L is the length of a resistor, S is the cross-section area of the resistor), if the area of electrode is decreased, but the resistance of electrode changes little, the reduction of the signal delay time is mainly due to the capacitance between the electrode and the common electrode being decreased.

Figure 4:
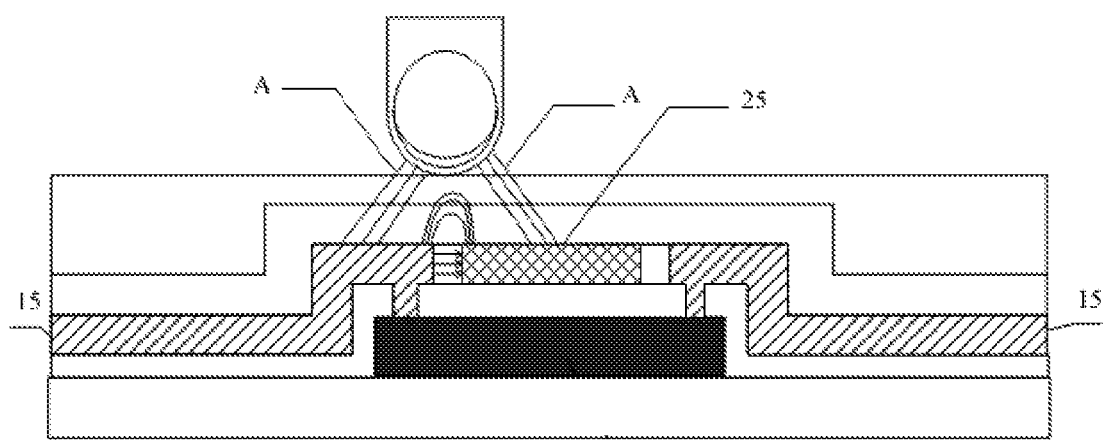
FIG. 4 is a sectional view of a capacitive touch panel according to an embodiment of the present invention.

FIG. 4 shows a principle of improving touch sensitivity of the electrodes far away from the sensing lead according to embodiments of the present invention. The action between a finger and a drive electrode 15 and a sensing electrode 25 creates a coupling capacitance Cp0, which is indicated by straight lines A in FIG. 4. The capacitance between the drive electrode 15 and the sensing electrode 25 is divided into two parts, one part is a capacitance Cp1 (indicated by straight line arrow in FIG. 4) between the directly opposite drive electrode and sensing electrode 25, another part is a capacitance Cp2 (indicated by curve in FIG. 4) through the above space of the drive electrode 15 and the sensing electrode 25. The finger sensitivity can be represented as: Q=Cp0/(Cp1+Cp2), wherein Q is the finger sensitivity. As can be seen, the bigger the ratio is, the greater the sensitivity is.

The distance d between the drive electrode 15 and the sensing electrode 25 is increased as area of the distal electrode is decreased, so both Cp1 and Cp2 are decreased adaptively, that is, the mutual capacitance between the drive electrode 15 and the sensing electrode 25 is decreased. The coupling capacitance Cp0 generated by the action between the finger and the drive electrode 15 and the sensing electrode 25 can be regarded as a constant value as the sizes of the fingers of different users are substantially same, so the finger sensitivity is increased.

Figure 3:
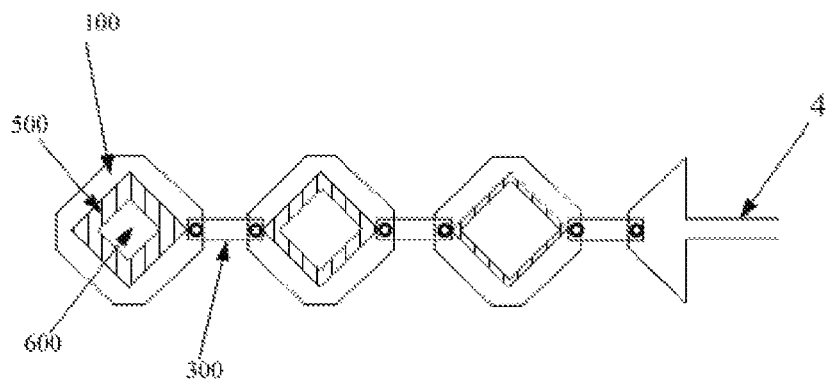
FIG. 3 is a structural schematic diagram of a capacitive touch panel according to another embodiment of the present invention.

FIG. 2 shows an arrangement of directly decreasing the electrode area. The arrangement can be the one as shown in FIG. 3 in actual practice. An annulus-like groove 500 represented by shadow portion is etched in the middle part of a drive electrode 100, to form a suspending electrode 600 within the annulus-like groove 500, which is not connected with the external electrode(s) of the annulus-like groove 500; and the area of the annulus-like groove 500 is controlled such that the farther away from the sensing lead 4 the electrode is, the smaller the area of the suspending electrode 600 contained in the electrode is. For example, the area of the suspending electrode 600 contained in each of drive electrodes 10 is sequentially decreased by 5% along the direction away from the sensing lead 4. In such a way, the farther away from the sensing lead 4 the electrode is, the smaller the area of the suspending electrode 600 contained in the electrode is, thus, the farther away from the sensing lead 4 the drive electrode 100 is, the smaller the capacitance of the drive electrode 100 is. Thus, same as the principle illustrated in FIG. 2, the signal delay time of the electrode in the drive electrode 100 which is far away from the sensing lead 4 is decreased, and the sensitivity is improved with respect to conventional drive electrode structure with same size.

It is noted that the suspending electrode 600 can have a varity of arrangements. The suspending electrode 600 can be disposed on a suitable position of the electrode (e.g., a drive electrode and/or a sensing electrode). Specifically, the suspending electrode 600 can be disposed around the electrode. The annulus-like groove can be formed by other process, rather than etching. The suspending electrode 600 can be formed in a shape of a square, a retangle, a circle (round), or the like. And there can be one or more suspending electrodes 600.

An embodiment of the present invention provides a touch display apparatus including the described capacitive touch panel(s).

The capacitive touch panel and touch display according to the embodiments of the present invention are configured such that the farther away from the sensing lead the electrode is, the smaller the capacitance of the electrode is, as such, the signal delay of the electrode far away from the sending lead is improved and the touch sensitivity is improved.

The above description are only exemplary embodiments of the present invention, but not intended to limit the scope of the present invention. The scope of the present invention is defined by the appended claims.

What is claimed is:

1. A capacitive touch panel, comprising:
a substrate; and
at least two transparent electrically conductive layers,
wherein a first transparent electrically conductive layer includes a first plurality of electrode groups along a first direction, a second transparent electrically conductive layer including a second plurality of electrode groups along a second direction, the first plurality of electrode groups and the second plurality of electrode groups are intersected and insulated from each other, each of the electrode groups includes a plurality of electrodes in series, each of the electrode groups connects to a sensing lead at one side, at least one of the electrode groups is arranged along a direction away from the sensing lead, a suspending electrode is disposed on each of the electrodes of the electrode groups and the suspending electrodes have areas gradually decreased along the direction away from the sensing lead, and capacitances formed between the electrodes of the at least one of the electrode groups and common electrodes are reduced gradually along the direction away from the sensing lead;
wherein the suspending electrode on each electrode is formed by etching an annulus-like groove on the electrode, and a region surrounded by the annulus-like groove is the suspending electrode.

2. The capacitive touch panel according to claim 1, wherein the electrodes of the at least one of the electrode groups are set to allow the effective areas for generating the capacitances to be gradually decreased along the direction away from the sensing lead.

3. The capacitive touch panel according to claim 2, wherein the electrodes of the at least one of the electrode groups have areas sequentially decreased by 5% along the direction away from the sensing lead.

4. The capacitive touch panel according to claim 3, wherein the electrode groups comprise a plurality of lateral drive electrode groups and a plurality of longitudinal sensing electrode groups; the drive electrode groups and the sensing electrode groups are insulated from each other; each of the drive electrode groups comprises a plurality of drive electrodes in series, and each of the sensing electrode groups comprises a plurality of sensing electrodes in series.

5. The capacitive touch panel according to claim 4, wherein the drive electrode groups are arranged along the direction away from the sensing leads, the drive electrodes of the drive electrode groups have areas gradually decreased along the direction; and/or the sensing electrode groups are arranged along the direction away from the sensing leads, and the sensing electrodes of the sensing electrode groups have areas gradually decreased along the direction.

6. The capacitive touch panel according to claim 2, wherein the electrode groups comprise a plurality of lateral drive electrode groups and a plurality of longitudinal sensing electrode groups; the drive electrode groups and the sensing electrode groups are insulated from each other; each of the drive electrode groups comprises a plurality of drive electrodes in series, and each of the sensing electrode groups comprises a plurality of sensing electrodes in series.

7. The capacitive touch panel according to claim 6, wherein the drive electrode groups are arranged along the direction away from the sensing leads, the drive electrodes of the drive electrode groups have areas gradually decreased along the direction; and/or the sensing electrode groups are arranged along the direction away from the sensing leads, and the sensing electrodes of the sensing electrode groups have areas gradually decreased along the direction.

8. The capacitive touch panel according to claim 1, wherein the suspending electrodes on the electrodes of the at least one of the electrode groups have areas sequentially decreased by 5% along the direction away from the sensing lead.

9. The capacitive touch panel according to claim 8, wherein the electrode groups comprise a plurality of lateral drive electrode groups and a plurality of longitudinal sensing electrode groups; the drive electrode groups and the sensing electrode groups are insulated from each other; each of the drive electrode groups comprises a plurality of drive electrodes in series, and each of the sensing electrode groups comprises a plurality of sensing electrodes in series.

10. The capacitive touch panel according to claim 1, wherein the electrode groups comprise a plurality of lateral drive electrode groups and a plurality of longitudinal sensing electrode groups; the drive electrode groups and the sensing electrode groups are insulated from each other; each of the drive electrode groups comprises a plurality of drive electrodes in series, and each of the sensing electrode groups comprises a plurality of sensing electrodes in series.

11. The capacitive touch panel according to claim 10, wherein the drive electrodes and the sensing electrodes are made of indium tin oxide (ITO).

12. The capacitive touch panel according to claim 10, wherein the drive electrode groups are arranged along the direction away from the sensing leads, the drive electrodes of the drive electrode groups have areas gradually decreased along the direction; and/or the sensing electrode groups are arranged along the direction away from the sensing leads, and the sensing electrodes of the sensing electrode groups have areas gradually decreased along the direction.

13. The capacitive touch panel according to claim 12, wherein the drive electrodes and the sensing electrodes are made of indium tin oxide (ITO).

14. A touch display apparatus, comprising the capacitive touch panel according to claim 1.

15. A capacitive touch panel, comprising:
a substrate; and
at least two transparent electrically conductive layers, wherein a first transparent electrically conductive layer includes a first plurality of electrode groups along a first direction, a second transparent electrically conductive layer including a second plurality of electrode groups along a second direction, the first plurality of electrode groups and the second plurality of electrode groups are intersected and insulated from each other, each of the electrode groups includes a plurality of electrodes in series, each of the electrode groups connects to a sensing lead at one side, at least one of the electrode groups is arranged along a direction away from the sensing lead, a suspending electrode is disposed on each of the electrodes of the electrode groups and the suspending electrodes have areas gradually decreased along the direction away from the sensing lead, and capacitances formed between the electrodes of the at least one of the electrode groups and common electrodes are reduced gradually along the direction away from the sensing lead, wherein the electrode groups comprise a plurality of lateral drive electrode groups and a plurality of longitudinal sensing electrode groups; the drive electrode groups and the sensing electrode groups are insulated from each other; each of the drive electrode groups comprises a plurality of drive electrodes in series, and each of the sensing electrode groups comprises a plurality of sensing electrodes in series.

16. The capacitive touch panel according to claim 15, wherein the drive electrode groups are arranged along the direction away from the sensing leads, the drive electrodes of the drive electrode groups have areas gradually decreased along the direction; and/or the sensing electrode groups are arranged along the direction away from the sensing leads, and the sensing electrodes of the sensing electrode groups have areas gradually decreased along the direction.

\* \* \* \* \*